C. E. GODLEY.
LAMP SUPPORT.
APPLICATION FILED APR. 13, 1917.
1,252,685.
Patented Jan. 8, 1918.
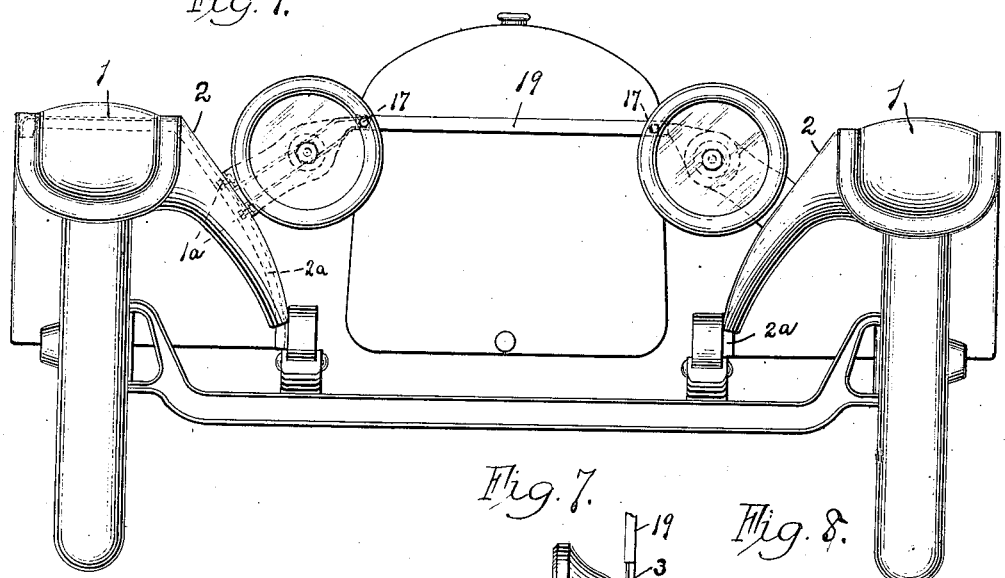
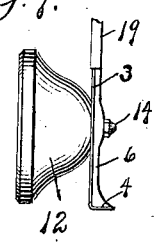
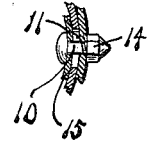
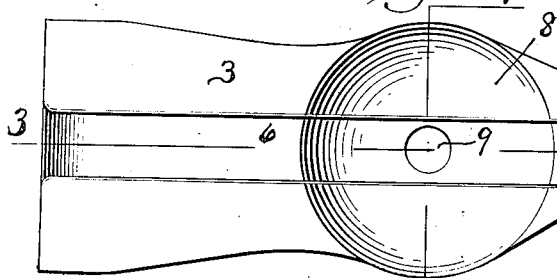
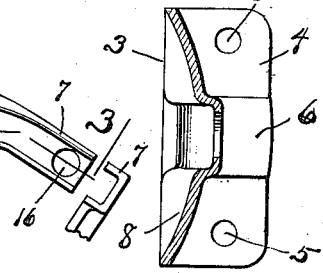
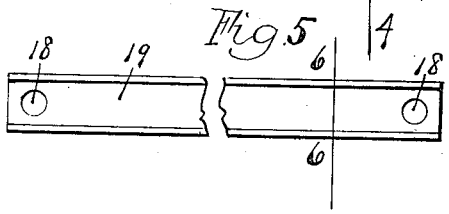
Inventor
Charles E. Godley.
By Pagelsen and Spencer
Attorneys.

UNITED STATES PATENT OFFICE.

CHARLES E. GODLEY, OF DETROIT, MICHIGAN, ASSIGNOR TO EDMUNDS AND JONES CORPORATION, OF DETROIT, MICHIGAN, A CORPORATION OF NEW YORK.

LAMP-SUPPORT.

1,252,685.

Specification of Letters Patent.  Patented Jan. 8, 1918.

Application filed April 13, 1917. Serial No. 161,737.

*To all whom it may concern:*

Be it known that I, CHARLES E. GODLEY, a citizen of the United States, and residing at Detroit, in the county of Wayne and State of Michigan, have invented a new and Improved Lamp-Support, of which the following is a specification.

This invention relates to means for supporting headlight lamps on the front end of motor vehicles, and its object is to provide a strong rigid structure which will not only support the lamps but will also serve as a brace across between the mud-guards extending over the front wheels.

This invention consists in a pair of lamp supports, preferably formed by pressing the same from sheet metal and providing them with stiffening ribs and with spherical seats to receive the lamps, and a tie rod connecting the upper ends of the lamp supports. It further consists in so forming the connection between the lamp supports and the lamps that the lamps can be readily adjusted to vary the directions of the light beams without changing the position of any other part of the vehicle.

In the accompanying drawing, Figure 1 is a front view of an automobile showing the improved lamp supports and tie rod in position. Fig. 2 is a front elevation of a lamp support. Fig. 3 is a section on the line 3—3 of Fig. 2. Fig. 4 is a section on the line 4—4 of Fig. 2. Fig. 5 is a rear elevation of a preferred form of tie rod. Fig. 6 is a section on the line 6—6 of Fig. 5. Fig. 7 is a plan on a smaller scale of a lamp support and the lamp carried thereby. Fig. 8 is a section showing the connection between the lamp and the lamp support.

Similar reference characters refer to like parts throughout the several views.

Headlights for automobiles are often mounted on supports secured to the mud-guards of the vehicle and in many cases tie-rods extend across between the lamp bodies for the purpose of bracing the lamps and the mud-guards. These connections and supports are often so constructed that the stresses come directly on the lamp bodies and are therefore liable to cause these bodies to be bent out of shape, while the mounting is so constructed that it is almost impossible to vary the direction of the beams of light. In the present case the two supports are secured to the mud-guards or fender irons and are connected together in order to brace the mud-guards and the lamp supports. While at the same time the lamps are detachably mounted on the supports.

In the drawing, the mud-guards 1 are shown to be of well known design, and the lamp supports are connected through the inclined sides 2 thereof and to the fender-irons 2ª by means of bolts 1ª. These lamps supports are preferably formed out of sheet metal, and each comprises a body 3, having a foot 4 provided with holes 5 for the bolts or rivets by means of which it is secured to the mud-guard or fender iron. The body is preferably formed with a longitudinal rib 6 to strengthen it, and the outer end 7 extends in a horizontal direction toward the same portion of the other support as shown in Fig. 1. The body of the support is formed with a spherical depression 8 and a hole 9 to receive the bolt 10 that extends through the hole 11 in the body 12 of the lamp. A nut 14 on the rear end of the bolt 10 may be tightened up to secure the lamp in position, a larger hole 11 in the body of the lamp permits it to be properly positioned before the nut is tightened up. A washer 15 may be placed under the head of this bolt 10 to fully cover the hole 11 in the body of the lamp.

The outer ends 7 of these supports are formed with holes 16 to receive bolts 17 that extend through the holes 18 of the tie rod 19 which is preferably of channel shape in order to be as stiff as possible for its weight and of sufficient width between flanges to receive the ends 7 of the supports. This tie-rod may be, however, of any desired cross-section.

After the supports and the tie-rod are secured in position, the bolts 10 are slipped into the holes 9, the nuts 14 being then partially tightened and the lamps slipped around until the beams therefrom strike the road-way at the desired points, after which the nuts are screwed down hard. The lamps can be easily and almost instantly removed and replaced without touching any other part of the vehicle. The proportions and details of construction may all be changed if desired,

I claim:—

1. A lamp support for a cup-shaped lamp-body formed of a sheet of metal and provided with a spherical seat, and a bolt to hold the lamp-body in said seat.

2. A lamp support comprising a substantially flat body having a foot by means of which it may be bolted to a portion of the vehicle and a spherical seat intermediate its ends and a hole at the middle of its seat to receive a bolt by means of which the rounded end of a cup shaped lamp body may be secured to said support.

3. A lamp support comprising a body and a foot at one end thereof formed with holes through which bolts may extend to secure the support in position on a vehicle, said body having a spherical depression and a hole in the middle thereof to receive a bolt by means of which a cup-shaped lamp body may be secured to the support, said body also having a stiffening rib extending from said foot to the opposite end, and means to brace said support.

4. A lamp support formed with a foot and with a spherical depression intermediate its ends to receive a lamp body and with a hole in the center of the depression to receive a bolt to hold the lamp body in position and with a reduced end opposite said foot and provided with a hole in said end to receive a brace.

CHARLES E. GODLEY.